United States Patent
Doumaux et al.

(10) Patent No.: US 10,723,901 B2
(45) Date of Patent: Jul. 28, 2020

(54) INKJET INK COMPOSITION

(71) Applicant: Hewlett-Packard Development Company, L.P., Spring, TX (US)

(72) Inventors: Howard Doumaux, San Diego, CA (US); Eduardo Amela Conesa, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/333,141

(22) PCT Filed: Jan. 31, 2017

(86) PCT No.: PCT/US2017/015906
§ 371 (c)(1),
(2) Date: Mar. 13, 2019

(87) PCT Pub. No.: WO2018/143961
PCT Pub. Date: Aug. 9, 2018

(65) Prior Publication Data
US 2019/0211223 A1 Jul. 11, 2019

(51) Int. Cl.
| | | |
|---|---|---|
| *C09D 11/40* | (2014.01) |
| *C09D 11/107* | (2014.01) |
| *C09D 11/322* | (2014.01) |
| *B41J 2/21* | (2006.01) |
| *B41M 5/00* | (2006.01) |
| *C09D 11/033* | (2014.01) |
| *C09D 11/037* | (2014.01) |

(52) U.S. Cl.
CPC ............ *C09D 11/40* (2013.01); *B41J 2/2107* (2013.01); *B41M 5/0023* (2013.01); *C09D 11/033* (2013.01); *C09D 11/037* (2013.01); *C09D 11/107* (2013.01); *C09D 11/322* (2013.01)

(58) Field of Classification Search
CPC ..... B41J 2/2107; B41J 2/5052; C09D 11/033; C09D 11/037; C09D 11/107; C09D 11/322; C09D 11/40
See application file for complete search history.

(56) References Cited

U.S. PATENT DOCUMENTS

| | | |
|---|---|---|
| 5,453,121 A | 9/1995 | Nicholls et al. |
| 6,824,598 B2 | 11/2004 | Thornberry et al. |
| 7,382,493 B2 | 6/2008 | Takahashi |
| 7,591,889 B2 | 9/2009 | Stoffel et al. |
| 7,696,262 B2 | 4/2010 | Cagle et al. |
| 7,744,205 B2 | 6/2010 | Sarkisian et al. |
| 8,033,627 B2 | 10/2011 | Hoshiyama et al. |
| 8,113,643 B2 | 2/2012 | Sarkisian et al. |
| 8,114,923 B2 | 2/2012 | Sarkisian et al. |
| 8,164,790 B2 | 4/2012 | Ng et al. |
| 8,267,505 B2 | 9/2012 | Jolly et al. |
| 8,440,742 B2 | 5/2013 | Cagle et al. |
| 8,783,842 B2 | 7/2014 | Ingle et al. |
| 8,883,873 B2 | 11/2014 | Loccufier et al. |
| 9,187,667 B2 | 11/2015 | Doumaux et al. |
| 2007/0084380 A1 | 4/2007 | Cagle et al. |
| 2008/0024575 A1* | 1/2008 | Yue et al. ............ 347/100 |
| 2011/0224362 A1 | 9/2011 | Westerman et al. |
| 2014/0285568 A1 | 9/2014 | Loccufier et al. |
| 2015/0225586 A1 | 8/2015 | Ingle et al. |

FOREIGN PATENT DOCUMENTS

| | | |
|---|---|---|
| EP | 2471879 | 7/2012 |
| JP | 2002059571 | 2/2002 |
| RU | 2343175 C2 | 1/2009 |
| WO | WO 2009078830 | 6/2009 |

OTHER PUBLICATIONS

International Search Report and Written Opinion for International Application No. PCT/US2017/015906 dated Oct. 5, 2017, 6 pages.

* cited by examiner

*Primary Examiner* — Juanita D Jackson
(74) *Attorney, Agent, or Firm* — HP Inc. Patent Department

(57) ABSTRACT

Herein is described an ink set for use in inkjet printing, comprising: a first cyan ink comprising from 1 wt % to 2.5 wt % of a cyan pigment, from 5 wt % to 15 wt % of a latex binder, and an ink vehicle; a second cyan ink comprising from 0.25 wt % to 0.64 wt % of a cyan pigment, from 5 wt % to 15 wt % of a latex binder, and an ink vehicle; a first magenta ink comprising from 2 wt % to 4 wt % of a magenta pigment, from 5 wt % to 15 wt % of a latex binder, and an ink vehicle; and a second magenta ink comprising from 0.4 wt % to 0.97 wt % of a magenta pigment, from 5 wt % to 15 wt % of a latex binder, and an ink vehicle, and methods of printing using the inkset.

14 Claims, No Drawings

INKJET INK COMPOSITION

BACKGROUND OF THE INVENTION

Colour inkjet printers typically use a four-ink inkset, termed a CYMK set, comprising cyan, yellow, magenta and black inks for printing a spectrum of colours on a media substrate.

Delivering optimal image quality in such inkjet ink sets is challenging, particularly on non-porous media substrates. Grain is a key image quality factor, and can result for many reasons, including isolated and clustered dot visibility, half-toning algorithm and method, printer hardware sources such as media advance and printhead ejection characteristics (drop size, directionality, single or multiple droplets, spray, etc.), and coalescence of ink droplets on the media surface. Coalescence describes wet ink drops touching one another on the surface of the media substrate and is particularly difficult to control on non-porous media. This coalescence artefact, which often occurs in high-speed printing, causes images to appear blotchy or "puddled", resulting in non-uniformity in solid fill areas, which is generally perceived as grain.

DETAILED DESCRIPTION OF THE INVENTION

Before particular embodiments of the present system and method are disclosed and described, it is to be understood that the present system and method are not limited to the particular process and materials disclosed herein as such may vary to some degree. It is also to be understood that the terminology used herein is used for the purpose of describing particular embodiments only and is not intended to be limiting, as the scope of the present system and method will be defined only by the appended claims and equivalents thereof.

In the present specification, and in the appended claims, the following terminology will be used:

The singular forms "a," "an," and "the" include plural referents unless the context clearly dictates otherwise. Thus, for example, reference to "a pigment" includes reference to one or more of such materials.

The terms "about" and "approximately," when referring to a numerical value or range is intended to encompass the values resulting from experimental error that can occur when taking measurements.

As used herein, the term "particle size" is a reference to the mean particle size by volume, as measured using laser diffraction techniques using diffractometers such as the Malvern Mastersizer, or Microtrac or Nanotrac diffractometers.

As used herein, "ink vehicle" or "liquid vehicle" is defined to include liquid compositions that can be used to carry pigments, to a substrate. Liquid vehicles are well known in the art, and a wide variety of liquid vehicle components may be used in accordance with examples of the present ink set and method. Such liquid vehicles may include a mixture of a variety of different agents, including without limitation, surfactants, co-solvents, buffers, biocides, viscosity modifiers, sequestering agents, stabilizing agents, humectants and water. Though not liquid per se, the liquid vehicle can also carry other solids, such as polymers, UV curable materials, plasticizers, salts, etc.

As used herein "pigment" refers to color imparting particulates that may be suspended in an ink vehicle. Pigments that can be used include self-dispersed pigments and non self-dispersed dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a non self-dispersed pigment that utilizes a separate and unattached dispersing agent (which can be a polymer, an oligomer, or a surfactant, for example) in the liquid vehicle or physically coated on the surface of the pigment. The dispersing agent can be non-ionic or ionic, anionic or cationic. If the dispersing agent is anionic, processing carboxyl groups, for example, the pigment is referred to as an "anionic pigment dispersion".

The term "decap" is a measure of how long a nozzle may remain inactive before plugging and how many inkjet architecture firings are required to re-establish proper drop ejection.

As used herein, the term "set" refers to a set of inks, whether packaged or made available as part of a set, or packaged and made available separately for use with other members of the set.

As used herein, the term "fastness" refers to that property of the printed image which helps maintain its color characteristics (e.g., Hue, Value, Chroma) which may include light fastness, ozone fastness, water fastness, or a combination thereof.

As used herein, the term "ramp" or "color ramp" refers to printing of inks or ink sets at various densities ranging from very low densities of ink to very high densities of ink. For example, with a black ink, a color ramp can be based on an $L^*$ value such that the $L^*$ value of a given color ranges from about 0 (black or near black) to about 95 (very light color). With a color (non-black) ink, color ramps can range from a $C^*$ or chroma of 0 to 130 depending upon the ink color and composition. Ramps are typically printed as diagnostic to determine the properties of several representative "color" points between two end points. For example, a color ramp might include 5 to 20 printed squares (or other shapes) which are relatively evenly spaced in color density, e.g., a magenta color ramp might include printed squares at $C^*$ values of 10, 20, 35, 50, 70, 85, and 95.

The terms "low-porous media" or "non-porous media" each refer to print media which has a Bristow Test of less than 2 ml/m$^2$ at a contact time of less than 0.5 s. The Bristow Test is known in the art and is summarized below. A test specimen of defined dimensions is affixed to the smooth rim of a wheel free to rotate at a defined constant speed in contact with a stationary test fluid applicator pressing against the test specimen with a defined pressure. The test fluid applicator consists of a test solution storage compartment affixed above a 1 by 15-mm test fluid delivery slot, the slot being positioned so that the long dimension is perpendicular to the direction of rotation of the rim of the wheel, and parallel to the wheel axis. A defined quantity of test fluid is placed through the fluid reservoir, onto the fluid delivery slot. With the wheel with the test specimen affixed rotating at constant speed, the test solution applicator is brought into contact with the rotating test specimen and held in place under defined pressure. The test fluid is transferred from the test solution applicator onto the test specimen in a band whose width, controlled by the applicator slot width is approximately 15 mm, and whose length is function of the absorptive characteristics of the test fluid interaction with the test specimen under the defined test conditions. The amount of liquid absorbed per unit area of test specimen is calculated from the volume of test fluid originally placed in the applicator, and the average width and length of the band created on the test specimen by the transferred test fluid. The time available for the liquid absorption is calculated from the volume of test fluid originally placed in the applicator and applicator geometry.

As used herein, "latex", "latex binder", "latex polymer," "latex particulates" or "latex particles" refer to the polymeric masses synthesized from individual monomers, which can be dispersed in a liquid vehicle forming a latex dispersion. The term "latex" generally refers to liquid and polymeric particles that are dispersed within the liquid. However, when a latex (i.e. a latex dispersion including latex polymer particles) is formulated within an ink, the liquid becomes part of the liquid vehicle of the ink, and thus, latex polymer can be described based on the latex particle or latex polymer solids that remain dispersed in the liquid vehicle. A latex may be a liquid suspension comprising a liquid (such as water and/or other liquids) and polymeric particulates from 20 nm to 500 nm (preferably from 100 nm to 300 nm) in size. Typically, the polymeric particulate can be present in the liquid at from 0.5 wt % to 35 wt %. Such polymeric particulates can comprise a plurality of monomers that are typically randomly polymerized, and can also be crosslinked. Additionally, in one embodiment, the latex component can have a glass transition temperature from about −20° C. to +100° C.

As used herein, "co-polymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

The term "monomer emulsion" refers to an organic monomer or monomer mix that is emulsified in an aqueous or water phase. Once the organic monomer or monomer mix is polymerized, a latex polymer dispersion is formed.

The term "latex polymer dispersion" or "latex dispersion" includes both latex particulates as well as the aqueous medium in which the latex particulates are dispersed. More specifically, a latex dispersion is a liquid suspension comprising a liquid (such as water and/or other liquids) and polymeric particulates from 20 nm to 500 nm (preferably from 100 nm to 300 nm) in size, and having a weight average molecular weight from about 10,000 Mw to 2,000,000 Mw (preferably from about 100,000 Mw to 300,000 Mw). Such polymeric particulates can comprise a plurality of monomers that are typically randomly polymerized, and can also be crosslinked. When crosslinked, the molecular weight can be even higher than that cited above. Average particle size can be determined by dynamic light scattering and other methods. Molecular weight can be determined by gel permeation chromatography.

The term "(meth)acrylate" is well understood in the art to refer to both acrylates and methacrylates. For example, "cyclohexyl (meth)acrylate" refers to cyclohexyl acrylate and/or cyclohexyl methacrylate. Likewise, the term "cycloaliphatic (meth)acrylate monomer" denotes a cycloaliphatic acrylate monomer and/or a cycloaliphatic methacrylate monomer; and the term "aromatic(meth)acrylate monomer" denotes an aromatic acrylate monomer and/or an aromatic methacrylate monomer.

The term "(meth)acrylamide" is well understood in the art to refer to both acrylamides and methacrylamides. For example, the term "cycloaliphatic (meth)acrylamide monomer" denotes a cycloaliphatic acrylamide monomer and/or a cycloaliphatic methacrylamide monomer; and the term "aromatic(meth)acrylamide monomer" denotes an aromatic acrylamide monomer and/or an aromatic methacrylamide monomer.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to approximately 20 wt % should be interpreted to include not only the explicitly recited concentration limits of 1 wt % to approximately 20 wt %, but also to include individual concentrations such as 2 wt %, 3 wt %, 4 wt %, and sub-ranges such as 5 wt % to 10 wt %, 10 wt % to 20 wt %, etc.

In the following description, for purposes of explanation, numerous specific details are set forth in order to provide a thorough understanding of the present ink set and method for inkjet printing. It will be apparent, however, to one skilled in the art, that the present method may be practiced without these specific details. Reference in the specification to "one example" or "an example" means that a particular feature, structure, or characteristic described in connection with the example is included in at least one example. The appearance of the phrase "in one example" in various places in the specification are not necessarily all referring to the same example.

Unless otherwise stated, any feature described herein can be combined with any aspect or any other feature described herein.

Unless otherwise stated, references herein to "wt %" of a component are to the weight of that component as a percentage of the whole composition comprising that component. For example, references herein to "wt %" of, for example, a solid material such as a pigment or latex polymer dispersed in a liquid composition are to the weight percentage of those solids in the composition, and not to the amount of that solid as a percentage of the total non-volatile solids of the composition.

The present inventors have found difficulties with improving image grain in the mid-tone regions of images printed on non-porous media substrates with inkjet inks, as well as controlling coalescence on these same substrates.

Therefore, the present inventors have sought to provide ink sets, for use in methods of inkjet printing, which can be used on non-porous substrates.

In an aspect there is provided an ink set for use in inkjet printing, comprising: a first cyan ink comprising from 1 wt % to 2.5 wt % of a cyan pigment, from 5 wt % to 15 wt % of a latex binder, and an ink vehicle; a second cyan ink comprising from 0.25 wt % to 0.64 wt % of a cyan pigment, from 5 wt % to 15 wt % of a latex binder, and an ink vehicle; a first magenta ink comprising from 2 wt % to 4 wt % of a magenta pigment, from 5 wt % to 15 wt % of a latex binder, and an ink vehicle; and a second magenta ink comprising from 0.4 wt % to 0.97 wt % of a magenta pigment, from 5 wt % to 15 wt % of a latex binder, and an ink vehicle.

In a further aspect, there is provided a method of inkjet printing, comprising: printing an amount of ink from an ink set onto a low or non-porous media substrate, the ink set comprising: a first cyan ink comprising from 1 wt % to 2.5 wt % of a cyan pigment, from 5 wt % to 15 wt % of a latex binder, and an ink vehicle; a second cyan ink comprising from 0.25 wt % to 0.64 wt % of a cyan pigment, from 5 wt % to 15 wt % of a latex binder, and an ink vehicle; a first magenta ink comprising from 2 wt % to 4 wt % of a magenta pigment, from 5 wt % to 15 wt % of a latex binder, and an ink vehicle; and a second magenta ink comprising from 0.4 wt % to 0.97 wt % of a magenta pigment, from 5 wt % to 15 wt % of a latex binder, and an ink vehicle.

Ink Set

According to one example, the present inkjet ink set comprises a first cyan ink comprising from 1 wt % to 2.5 wt % of a cyan pigment, from 5 wt % to 15 wt % of a latex binder, and an ink vehicle; a second cyan ink comprising from 0.25 wt % to 0.64 wt % of a cyan pigment, from 5 wt % to 15 wt % of a latex binder, and an ink vehicle; a first magenta ink comprising from 2 wt % to 4 wt % of a magenta pigment, from 5 wt % to 15 wt % of a latex binder, and an ink vehicle; and a second magenta ink comprising from 0.4 wt % to 0.97 wt % of a magenta pigment, from 5 wt % to 15 wt % of a latex binder, and an ink vehicle.

First Cyan Ink

In one example, the first cyan ink comprises from 1 wt % to 2.5 wt % of a cyan pigment, from 5 wt % to 15 wt % of a latex binder, and an ink vehicle. The first cyan ink may be referred to as a dark cyan ink, due to the higher pigment loading than in the second cyan ink.

In one example, the first cyan ink comprises from 1.2 wt % to 2.2 wt % of a cyan pigment. In one example, the first cyan ink comprises from 1.5 wt % to 2.0 wt % of a cyan pigment. Cyan pigments suitable for use in the first cyan ink are described below in the section titled Pigments.

In one example, the first cyan ink comprises from 5 wt % to 15 wt % of a latex binder, for example from 7 wt % to 13 wt % of a latex binder, for example from 8 wt % to 12 wt % of a latex binder. Latex binders suitable for use in the first cyan ink are described below in the section titled Latex Binders.

In one example, the first cyan ink comprises an ink vehicle, which may include a variety of different agents, including without limitation, surfactants, co-solvents, buffers, biocides, viscosity modifiers, sequestering agents, stabilizing agents, and water. Further details on the ink vehicle and its components are described below in the section titled Ink Vehicle.

Second Cyan Ink

In one example, the second cyan ink comprises from 0.25 wt % to 0.64 wt % of a cyan pigment, from 5 wt % to 15 wt % of a latex binder, and an ink vehicle. The second cyan ink may be referred to as a light cyan ink, due to the lower pigment loading than in the first cyan ink.

In one example, the second cyan ink comprises from 0.3 wt % to 0.6 wt % of a cyan pigment. In one example, the second cyan ink comprises from 0.4 wt % to 0.6 wt % of a cyan pigment. In one example, the second cyan ink comprises from 0.5 wt % to 0.6 wt % of a cyan pigment. Cyan pigments suitable for use in the second cyan ink are described below in the section titled Pigments.

In one example, the second cyan ink comprises from 5 wt % to 15 wt % of a latex binder, for example from 7 wt % to 13 wt % of a latex binder, for example from 8 wt % to 12 wt % of a latex binder. Latex binders suitable for use in the second cyan ink are described below in the section titled Latex Binders.

In one example, the second cyan ink comprises an ink vehicle, which may include a variety of different agents, including without limitation, surfactants, co-solvents, buffers, biocides, viscosity modifiers, sequestering agents, stabilizing agents, and water. Further details on the ink vehicle and its components are described below in the section titled Ink Vehicle.

First Magenta Ink

In one example, the first magenta ink comprises from 2 wt % to 4 wt % of a magenta pigment, from 5 wt % to 15 wt % of a latex binder, and an ink vehicle. The first magenta ink may be referred to as a dark magenta ink, due to the higher pigment loading than in the second magenta ink.

In one example, the first magenta ink comprises from 2.5 wt % to 3.5 wt % of a magenta pigment. In one example, the first magenta ink comprises from 3 wt % to 3.3 wt % of a magenta pigment. Magenta pigments suitable for use in the first magenta ink are described below in the section titled Pigments.

In one example, the first magenta ink comprises from 5 wt % to 15 wt % of a latex binder, for example from 7 wt % to 13 wt % of a latex binder, for example from 8 wt % to 12 wt % of a latex binder. Latex binders suitable for use in the first magenta ink are described below in the section titled Latex Binders.

In one example, the first magenta ink comprises an ink vehicle, which may include a variety of different agents, including without limitation, surfactants, co-solvents, buffers, biocides, viscosity modifiers, sequestering agents, stabilizing agents, and water. Further details on the ink vehicle and its components are described below in the section titled Ink Vehicle.

Second Magenta Ink

In one example, the second magenta ink comprises from 0.4 wt % to 0.97 wt % of a magenta pigment, from 5 wt % to 15 wt % of a latex binder, and an ink vehicle. The second magenta ink may be referred to as a light magenta ink, due to the lower pigment loading than in the first magenta ink.

In one example, the second magenta ink comprises from 0.5 wt % to 0.95 wt % of a magenta pigment. In one example, the second magenta ink comprises from 0.6 wt % to 0.93 wt % of a magenta pigment. In one example, the second magenta ink comprises from 0.7 wt % to 0.90 wt % of a magenta pigment. Magenta pigments suitable for use in the second magenta ink are described below in the section titled Pigments.

In one example, the second magenta ink comprises from 5 wt % to 15 wt % of a latex binder, for example from 7 wt % to 13 wt % of a latex binder, for example from 8 wt % to 12 wt % of a latex binder. Latex binders suitable for use in the second magenta ink are described below in the section titled Latex Binders.

In one example, the second magenta ink comprises an ink vehicle, which may include a variety of different agents, including without limitation, surfactants, co-solvents, buffers, biocides, viscosity modifiers, sequestering agents, stabilizing agents, and water. Further details on the ink vehicle and its components are described below in the section titled Ink Vehicle.

Black Ink

In one example, the inkjet ink set comprises a black ink, comprising from 1 wt % to 5 wt % of a black pigment, from 5 wt % to 15 wt % of a latex binder, and an ink vehicle.

In one example, the black ink comprises from 1.5 wt % to 4.5 wt % of a black pigment. In one example, the black ink comprises from 2 wt % to 4 wt % of a black pigment. In one example, the black ink comprises from 2.2 wt % to 3 wt % of a black pigment. Black pigments suitable for use in the black ink are described below in the section titled Pigments.

In one example, the black ink comprises from 5 wt % to 15 wt % of a latex binder, for example from 7 wt % to 13 wt % of a latex binder, for example from 8 wt % to 12 wt % of a latex binder. Latex binders suitable for use in the black ink are described below in the section titled Latex Binders.

In one example, the black ink comprises an ink vehicle, which may include a variety of different agents, including without limitation, surfactants, co-solvents, buffers, biocides, viscosity modifiers, sequestering agents, stabilizing agents, and water. Further details on the ink vehicle and its components are described below in the section titled Ink Vehicle.

Yellow Ink

In one example, the inkjet ink set comprises a yellow ink, comprising from 1 wt % to 5 wt % of a black pigment, from 5 wt % to 15 wt % of a latex binder, and an ink vehicle.

In one example, the yellow ink comprises from 1.5 wt % to 4.5 wt % of a yellow pigment. In one example, the yellow ink comprises from 2 wt % to 4 wt % of a yellow pigment. In one example, the yellow ink comprises from 2.2 wt % to 3 wt % of a yellow pigment. Yellow pigments suitable for use in the yellow ink are described below in the section titled Pigments.

In one example, the yellow ink comprises from 5 wt % to 15 wt % of a latex binder, for example from 7 wt % to 13 wt % of a latex binder, for example from 8 wt % to 12 wt % of a latex binder. Latex binders suitable for use in the yellow ink are described below in the section titled Latex Binders.

In one example, the yellow ink comprises an ink vehicle, which may include a variety of different agents, including without limitation, surfactants, co-solvents, buffers, biocides, viscosity modifiers, sequestering agents, stabilizing agents, and water. Further details on the ink vehicle and its components are described below in the section titled Ink Vehicle.

Further details on the components of the ink compositions described above will be described in general below.

Pigments

Typically, the pigments of any of the inks described above can be from about 10 nm to about 10 µm and in one example can be from 10 nm to about 500 nm in diameter, although sizes outside this range can be used if the pigment can remain dispersed and provide adequate color properties.

In one example, the pigment particles of any of the inks described have a mean particle size by volume greater than about 150 nm, for example greater than about 175 nm, for example greater than about 180 nm, for example greater than about 190 nm, for example greater than about 200 nm, for example greater than about 250 nm, for example greater than about 300 nm, for example greater than 400 nm.

In one example, the pigment particles of any of the inks described have a mean particle size by volume less than about 400 nm, for example less than about 300 nm, for example less than about 250 nm, for example less than about 200 nm, for example less than about 190 nm, for example less than about 180 nm, for example less than about 175 nm, for example about 150 nm.

The cyan pigment to be used in the first or second cyan inks can be any commercially available cyan pigment that provides acceptable optical density and print characteristics. Representative examples of phthalocyanine blues include copper phthalocyanine blue and derivatives thereof (Pigment Blue 15). Non-limiting examples of cyan pigments include BASF pigments such as Heliogen® Blue L 6901F, Heliogen® Blue NBD 7010, Heliogen® Blue K 7090, Heliogen® Blue L 7101F, Paliogen® Blue L 6470; Heuback pigments such as Heucophthal® Blue G, other pigments such as CI Pigment Blue 15, CI Pigment Blue 15:1, CI Pigment Blue 15:2, Pigment Blue 15:3, and Pigment Blue 15:4, and combinations thereof.

The magenta pigment to be used in the first or second magenta inks can be any commercially available magenta pigment that provides acceptable optical density and print characteristics. Non-limiting examples of magenta pigments include CI Pigment Red 5, CI Pigment Violet 19, CI Pigment Red 7, CI Pigment Red 12, CI Pigment Red 48:1-5, Pigment Red 57:1-5 CI Pigment Red 112, CI Pigment Red 122, pigments by Ciba-Geigy such as Irgalite® Rubine 4BL, Monastral® Magenta, and Monastral® Scarlet; pigments by Mobay such as Quindo® Magenta and Indofast® Brilliant Scarlet; and pigments by Hoechst such as Hostaperm® Scarlet GO and Permanent Rubine F6B; others pigments such as Pigment Red 122, Pigment Red 192, Pigment Red 202, Pigment Red 206, Pigment Red 207, Pigment Red 209, Pigment Red 43, Pigment Red 194, Pigment Red 216 and Pigment Red 226, Pigment Red 123, Pigment Red 149, Pigment Red 179, Pigment Red 190, Pigment Red 189, Pigment Red 224, Pigment Red 86, Pigment Red 87, Pigment Red 88, Pigment Red 181, Pigment Red 198, CI Pigment Red 264, and combinations thereof. Quinacridone pigments such as PR122, PV19, PR202, and others may also exist as a so-called "solid solution" where the individual molecules are mixed as a distinct crystal structure.

The black pigment to be used in the black ink can be any commercially available black pigment that provides acceptable optical density and print characteristics. Such black pigments (Color Index Pigment Black 7, CI PB1 7) can be manufactured by a variety of known methods such as channel methods, contact methods, furnace methods, acetylene methods, or thermal methods, and are commercially available from such vendors as Cabot Corporation, Columbian Chemicals Company, Evonik, and Mitsubishi. For example, commercially available carbon black pigments include Cabot: Monarch™ 1400, Monarch™ 1300, Monarch™ 1100, Monarch™ 1000, Monarch™ 900, Monarch™ 880, Monarch™ 800, and Monarch™ 700, Cab-O-Jet™ 200, Cab-O-Jet™ 300, Black Pearls™ 2000, Black Pearls™ 1400, Black Pearls™ 1300, Black Pearls™ 1100, Black Pearls™ 1000, Black Pearls™ 900, Black Pearls™ 880, Black Pearls™ 800, Black Pearls™ 700; the following are available from Columbian: Raven 7000, Raven 5750, Raven 5250, Raven 5000, and Raven 3500; the following are available from Evonik: Color Black FW 200, Color Black FW 2, Color Black FW 2V, Color Black FW 1, Color Black FW 18, Color Black S 160, Color Black FW S 170, Special Black 6, Special Black 5, Special Black 4A, Special Black 4, Printex U, Printex 140U, Printex V, and Printex 140V, and combinations thereof.

The yellow pigment to be used in the yellow ink can be any commercially available yellow pigment that provides acceptable optical density and print characteristics. Non-limiting examples of yellow pigments include pigments by Hoechst such as Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Dalamar0 Yellow YT-858-D, Hansa Yellow X, Novoperm® Yellow FGL, Hansa Brilliant Yellow 10GX, Permanent Yellow G3R-01, Hostaperm® Yellow H4G, Hostaperm® Yellow H3G, and Novoperm® Yellow HR; pigments by Ciba-Geigy such as Chromophtal® Yellow 3G, Chromophtal® Yellow GR, Chromophtal® Yellow 8G, and Irgazin® Yellow SGT; and pigments by Sun Chem. such as L74-1357 Yellow, L75-1331 Yellow and L75-2377 Yellow. Other examples include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, CI Pigment Yellow 93, CI Pigment Yellow 110, Pigment Yellow 151, Pigment Yellow 117, Pigment Yellow 128, Pigment Yellow 138, Yellow Pigment 155, CI Pigment Yellow 213, CI Pigment Yellow 150, CI Pigment Yellow 219, CI Pigment Yellow 220 and combinations thereof.

Latex Binder

Each component of the inkjet ink system includes from 5 wt % to 15 wt % latex binder, for example from 7 wt % to 13 wt % of a latex binder, for example from 8 wt % to 12 wt % of a latex binder by total weight of the inkjet ink composition.

In one example, the latex binder is also referred to as a latex polymer.

Latex polymers can be prepared using any of a number of methods known in the art, including but not limited to emulsion polymerization techniques where co-monomers are dispersed and polymerized in a discontinuous phase of an emulsion. The latexes can also be dispersions of polymer prepared by other techniques known to those in the art.

The monomers used in the latexes can be vinyl monomers. In some examples, the monomers from which the latex polymer is formed are selected from vinyl monomers, acrylate monomers, methacrylate monomers, styrene monomers, ethylene, vinyl chloride, vinylidene chloride, maleate esters, fumarate esters, itaconate esters and combinations thereof. In some examples, monomers from which the latex polymer is formed may comprise ethyl acrylate; ethyl methacrylate; benzyl acrylate; benzyl methacrylate; propyl acrylate; propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyclopentyl ether acrylate; vinyl ethyl ketone; vinyl propyl ketone; vinyl hexyl ketone; vinyl octyl ketone; vinyl butyl ketone; cyclohexyl acrylate; methoxysilane; acryloxypropyhiethyldimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; iso-butyl acrylate; iso-butyl methacrylate; 2-ethylhexyl acrylate; 2-ethylhexyl methacrylate; iso-octyl acrylate; iso-octyl methacrylate; and combinations thereof.

In some examples, the latex polymer is formed from monomers selected from styrenes, C1 to C8 alkyl methacrylates, C1 to C8 alkyl acrylates, ethylene glycol methacrylates and dimethacrylates, methacrylic acids, acrylic acids, and combinations thereof. Examples of latex polymers that can be used include those prepared using a monomer emulsion of methyl methacrylate, butyl acrylate, cyclohexyl methacrylate and methacrylic acid, which are copolymerized to form the latex.

In some examples, the monomers from which the latex polymer is formed include acid monomers, such as (meth) acrylic acid monomers. Acidic monomers that can be polymerized in forming latexes include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof.

In some examples, the latex polymer comprises a (meth) acrylate polymer or copolymer. In some examples, the latex polymer comprises a (meth)acrylate copolymer. For example, the latex polymer may comprise a copolymer of a (meth)acrylate monomer and another vinyl monomer, for example another vinyl monomer selected from styrenes, C1 to C8 alkyl methacrylates, C1 to C8 alkyl acrylates, ethylene glycol methacrylates and dimethacrylates, methacrylic acids, acrylic acids, and combinations thereof.

In some examples, the latex polymer comprises a (meth) acrylate polymer being a polymer comprising (meth)acrylate monomers or a (meth)acrylate copolymer being a copolymer comprising (meth)acrylate monomers. In some examples, the latex polymer comprises a (meth)acrylate copolymer comprising (meth)acrylate monomers. In some examples the (meth)acrylate copolymer comprises (meth) acrylate monomers and vinyl monomers selected from styrenes, C1 to C8 alkyl methacrylates, C1 to C8 alkyl acrylates, ethylene glycol methacrylates and dimethacrylates, methacrylic acids, acrylic acids, and combinations thereof.

In some examples, the (meth)acrylate monomers are selected from aliphatic (meth)acrylate monomers, aromatic (meth)acrylate monomers and combinations thereof.

In some examples, aliphatic (meth)acrylate monomers comprise linear aliphatic (meth)acrylate monomers and/or cycloaliphatic (meth)acrylate monomers.

In some examples, linear (meth)acrylate monomers comprise alkyl (meth)acrylate monomers (for example C1 to C8 alkyl (meth)acrylate monomers). In some examples, the linear (meth)acrylate monomers comprise alkyl methacrylate monomers (e.g. C1 to C8 alkyl methacrylate monomers). In some examples, the linear (meth)acrylate monomers comprise alkyl methacrylate monomers (e.g. C1 to C8 alkyl methacrylate monomers) and alkyl acrylate monomers (C1 to C8 alkyl acrylate monomers).

In some examples, the latex polymer comprises a copolymer comprising alkyl (meth)acrylate (e.g. C1 to C8 alkyl (meth)acrylate monomers) and styrene monomers. In some examples, the latex polymer comprises a copolymer comprising alkyl (meth)acrylate (e.g. C1 to C8 alkyl (meth) acrylate monomers), cyclohexyl methacrylate monomers and (meth)acrylic acid monomers.

In some examples, the latex inkjet ink composition comprises up to about 35 wt. % latex polymer by total weight of the inkjet ink composition. In some examples, the latex inkjet ink composition comprises up to about 30 wt. % latex polymer by total weight of the inkjet ink composition. In some examples, the latex inkjet ink composition comprises up to about 25 wt. % latex polymer by total weight of the inkjet ink composition. In some examples, the latex inkjet ink composition comprises up to about 20 wt. % latex polymer by total weight of the inkjet ink composition. In some examples, the latex inkjet ink composition comprises up to about 15 wt. % latex polymer by total weight of the inkjet ink composition.

In some examples, the latex inkjet ink composition comprises at least about 1 wt. % latex polymer by total weight of the inkjet ink composition. In some examples, the latex inkjet ink composition comprises at least about 2 wt. % latex polymer by total weight of the inkjet ink composition. In some examples, the latex inkjet ink composition comprises at least about 5 wt. % latex polymer by total weight of the inkjet ink composition. In some examples, the latex inkjet ink composition comprises at least about 10 wt. % latex polymer by total weight of the inkjet ink composition. In some examples, the latex inkjet ink composition comprises at least about 15 wt. % latex polymer by total weight of the inkjet ink composition.

In some examples, the latex inkjet ink composition comprise from about 1 wt. % to about 35 wt. % latex polymer by total weight of the inkjet ink composition. In some examples, the latex inkjet ink composition comprise from about 2 wt. % to about 30 wt. % latex polymer by total weight of the inkjet ink composition. In some examples, the latex inkjet ink composition comprise from about 5 wt. % to about 25 wt. % latex polymer by total weight of the inkjet ink composition.

In some examples, the latex inkjet ink composition comprise from about 5 wt. % to about 15 wt. % latex polymer by total weight of the inkjet ink composition. In some examples, the latex inkjet ink composition comprise from about 7 wt. % to about 13 wt. % latex polymer by total weight of the inkjet ink composition. In some examples, the latex inkjet ink composition comprise from about 9 wt. % to about 11 wt. % latex polymer by total weight of the inkjet ink composition.

It will be understood that other latex binders may also be useful in the ink set and method described herein, such as those described in U.S. Pat. Nos. 9,187,667, 8,783,842, 8,440,742, 8,267,505, 8,113,643, 8,114,923, 7,744,205, and 7,696,262, the contents of all of which are incorporated herein by reference.

Ink Vehicle

Each of the components of the ink set comprises an ink vehicle, which may include a variety of different agents, including without limitation, surfactants, co-solvents, buffers, biocides, viscosity modifiers, sequestering agents, stabilizing agents, humectants, and water.

In one example, the ink vehicle includes water as the base solvent and so is termed an aqueous ink vehicle.

Co-Solvent

In one example, the ink vehicle also includes one or more co-solvents. Classes of co-solvents that can be used can include organic co-solvents including aliphatic alcohols, aromatic alcohols, diols, glycol ethers, polyglycol ethers, 2-pyrrolidinones, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

In one example, the ink vehicle includes one or more aliphatic alcohols as co-solvents in an amount of at least about 4 wt % of the total weight of the ink composition, for example at least about 5 wt %, for example at least about 6 wt %, for example at least about 7 wt %, for example at least about 8 wt %, for example at least about 9 wt %, for example at least about 10 wt %, for example at least about 12 wt %, for example at least about 14 wt %, for example at least about 16 wt %, for example at least about 18 wt %, for example at least about 20 wt %, for example at least about 25 wt %, for example at least about 30 wt %, for example at least about 35 wt %, for example at least about 40 wt %.

In one example, the ink vehicle includes one or more aliphatic alcohols as co-solvents in an amount of less than about 40 wt % of the total weight of the ink composition, for example less than about 35 wt %, for example less than about 30 wt %, for example less than about 25 wt %, for example less than about 20 wt %, for example less than about 18 wt %, for example less than about 16 wt %, for example less than about 14 wt %, for example less than about 12 wt %, for example less than about 10 wt %, for example less than about 9 wt %, for example less than about 8 wt %, for example less than about 7 wt %, for example less than about 6 wt %, for example less than about 5 wt %, for example about 4 wt %.

In one example, the ink vehicle includes butanediol, for example 1,2-butanediol as co-solvent in an amount of at least 4 wt % of the total weight of the ink composition. In one example, the ink vehicle comprises butanediol, for example 1,2-butanediol, in the amounts stated in the preceding paragraphs.

In one example, the ink vehicle includes one or more glycol ethers as co-solvents. In one example, the ink vehicle includes one or more glycol ethers as co-solvents in an amount of at least about 0.05 wt % of the total weight of the ink composition, for example at least about 0.1 wt %, for example at least about 0.5 wt %, for example at least about 1 wt %, for example at least about 1.5 wt %, for example at least about 2 wt %, for example at least about 2.5 wt %, for example at least about 3 wt %, for example at least about 3.5 wt %, for example at least about 4 wt %, for example at least about 4.5 wt %, for example at least about 5 wt %.

In one example, the ink vehicle includes one or more glycol ethers as co-solvents in an amount of less than about 5 wt % of the total weight of the ink composition, for example less than about 4.5 wt %, for example less than about 4 wt %, for example less than about 3.5 wt %, for example less than about 3 wt %, for example less than about 2.5 wt %, for example less than about 2 wt %, for example less than about 1.5 wt %, for example less than about 1 wt %, for example less than about 0.5 wt %, for example less than about 0.1 wt %, for example about 0.05 wt %.

Suitable glycol ethers include ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether, tripropylene glycol methyl ether, available from Dow or Sigma-Aldrich. In one example, the ink vehicle comprises tripropylene glycol methyl ether in the amounts stated in the preceding paragraphs.

In one example, the ink vehicle comprises 2-pyrrolidone in an amount of less than about 15 wt %, for example less than about 12 wt %, for example less than about 10 wt %, for example less than about 8 wt %, for example less than about 7 wt %, for example less than about 6 wt %, for example less than about 5 wt %, of the total weight of the ink composition.

In one example, the ink vehicle comprises 2-pyrrolidone in an amount of greater than about 5 wt %, for example greater than about 6 wt %, for example greater than about 7 wt %, for example greater than about 8 wt %, for example greater than about 9 wt %, for example greater than about 10 wt %, for example greater than about 12 wt %, for example greater than about 15 wt % of the total weight of the ink composition.

Additives

Wax

In one example, the present ink-jet inks include a wax. Wax emulsions are commercially available from a number of vendors, for example Keim-Additec, Lubrizol, Michelman, and BYK Chemie. Wax emulsions that are useful include but are not limited to: Lubrizol: Liquilube™ 411, Liquilube™ 405, Liquilube™ 488, Liquilube™ 443, Liquilube™ 454; Michelman: ME80825, ME48040, ME98040M1, ME61335, ME90842, ME91240, ML160; Keim-Additec: Ultralube® E-521/20, Ultralube® E-7093, Ultralube® 7095/1, Ultralube® E-8046, Ultralube® E-502V, Ultralube® E-842N: Byk: Aquacer® 2650, Aquacer® 507, Aquacer® 533, Aquacer® 515, Aquacer® 537, Aquaslip™ 671, Aquaslip™ 942.

In one example, the wax can have a melting point ranging from 60° C. to 110° C. Generally, the wax can have a particle size ranging from 50 nm to 600 nm. In one example, the wax can have a particle size ranging from 200 nm to 300 nm. Generally, the wax can be present in the ink at a concentration ranging from 0.25 wt % to 5 wt %. In one example, the wax can be present ranging from 0.5 wt % to 1.5 wt %. Additionally, the wax emulsions can be compatible with high acid acrylic dispersants and hydrocolloids. By compatible, the present waxes can be used without causing aggregation or precipitation of the dispersants/hydrocolloids particularly over extended periods of time (weeks/months at ambient temperature or days/weeks at elevated temperature such as 40° C. to 65° C.). Incompatibility can manifest itself variously by increases in wax particle size, phase separation of wax, or creaming at a faster rate than in the absence of destabilizing materials.

Surfactant

In one example, each of the ink sets may further comprise one or more surfactants. In one example, one or more non-ionic, cationic, and/or anionic surfactants can be present in any of the ink sets described, ranging from 0.01 wt % to 10 wt %. Non-limiting examples of such surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, substituted amine oxides, polyethylene oxide alkyl sulfonates, polyethylene oxide alkyl sulfates, polyethylene oxide alkyl phosphates, and the like, as well as fluorocarbon and silicone surfactants. In one example, the present ink-jet inks can include alkyl ethoxylate surfactants. Such surfactants can include, but are not limited to, TERGITOL® 15-S-7, TERGITOL® 15-S-9, TERGITOL® TMN-6 90 percent, and NEODOL® 91-6. In some examples, the surfactant may be a non-ionic surfactant, such as a silicone-free alkoxylated alcohol surfactant such as, for example, Tergitol® 15-S-7 (Dow Chemical), present in an amount of about 0.1 to 1.5 wt % of the total ink composition, or, in another example, present in an amount of about 0.95 wt %. Other suitable surfactants include non-ionic fluorosurfactants, including those available from DuPont™ such as Capstone® FS-35, FS-34, FS-65 and the Zonyl® range of fluorosurfactants such as FSO-100.

In one example, the one or more surfactants can have an HLB value ranging from about 12 to about 13.5. As used herein, "HLB" refers to hydrophile-lipophile-balance which is a measure of the balance or proportion of hydrophilic to lipophilic portions of a molecule. In another example, the one or more surfactants can each be present in the ink-jet ink at a concentration ranging from about 0.01 wt % to about 0.5 wt %.

Various other additives may be employed to enhance the properties of each ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

There is also provided a method of preparing an inkjet ink composition for use in the inkset described herein, comprising mixing a colorant, a latex binder and an ink vehicle. In one example, the method comprises preparing one or more of a first magenta ink, a second magenta ink, a first cyan ink, a second cyan ink, a black ink or a yellow ink comprising the amounts of colorant as described herein.

Method of Printing

The present disclosure relates also to a method of inkjet printing, comprising printing an amount of ink from an ink set onto a low or non-porous media substrate, the ink set being as described herein. In one example, the printing method comprises a thermal inkjet printing method.

In one example, the method of inkjet printing comprises printing an amount of ink from an ink set onto a low or non-porous media substrate, the ink set comprising: a first cyan ink comprising from 1 wt % to 2.5 wt % of a cyan pigment, from 5 wt % to 15 wt % of a latex binder, and an ink vehicle; a second cyan ink comprising from 0.25 wt % to 0.64 wt % of a cyan pigment, from 5 wt % to 15 wt % of a latex binder, and an ink vehicle; a first magenta ink comprising from 2 wt % to 4 wt % of a magenta pigment, from 5 wt % to 15 wt % of a latex binder, and an ink vehicle; and a second magenta ink comprising from 0.4 wt % to 0.97 wt % of a magenta pigment, from 5 wt % to 15 wt % of a latex binder, and an ink vehicle.

In one example, the low or non-porous media substrate comprises one or more of vinyl, polycarbonate, polytetrafluoroethylene (PTFE), polyester, acrylic, polyethylene, polypropylene, polystyrene, cellulose, a metal, a ceramic, or a glass.

EXAMPLES

The following illustrates examples of the compositions and related aspects described herein. Thus, these examples should not be considered to restrict the present disclosure, but are merely in place to teach how to make examples of compositions of the present disclosure.

A series of light and dark inks were formulated aimed at improving image grain and coalescence seen with high light ink coverage. These inks were then printed and new colormaps and icc profiles were generated for each ink set. The sets are shown in Tables 1 to 4.

The acrylic latex of all examples was prepared as follows: water (38.4 g) was heated to 75° C. with mechanical agitation. At 75° C., 0.14 g, potassium persulfate dissolved in water (4% solution) was added. At 77° C., a seed of latex (0.84 g on solid basis; 67 nm particle size) was added to the reactor. To this mixture was added over 300 minutes an aqueous emulsion comprised of water (11.3 g), copolymerizable surfactant selected from Hitenol BC-10 (1.2 g), methyl methacrylate (0.6 g), cyclohexyl methacrylate (24.1 g), cyclohexyl acrylate (6.8 g) and methacrylic acid (1.4 g). Residual monomer was reduced by typical methodology using ascorbic acid and tert-butyl hydroperoxide. After cooling the near ambient temperature, pH was adjusted to ~8 with dilute potassium hydroxide; inkjet suitable aqueous biocides were added. The resulting acrylic latex was 35.2% solids; particle size 0.22µ; viscosity <50 cps.

Pigments used were: quinacridone (magenta), phthalocyanine blue (cyan), pigment yellow 155 (yellow), pigment black 7 (carbon black). Dowanal™ TPM is a glycol ether from Dow; Capstone™ FS-35 is a non-ionic fluorosurfactant from DuPont; Tergitol® 15-S-7 and TMN-6 are non-ionic surfactants from Sigma-Aldrich; Crodafos™ N3 acid is a phosphate ester surfactant available from Croda Inc.; Trilon® M is a chelating agent from BASF and Carbosperse™ K-7028 is a dispersant from Lubrizol.

Grain was then visually examined after printing. The print method was performed on an HP L360 inkjet printer, with a 6 pass mode, on a vinyl substrate (Avery MPI3000). It was surprisingly found that the most dilute light inks do not lead to minimal grain in an optimized system. Rather, an intermediate concentration, as exemplified by the light cyan and light magenta inks of Example 3 gave minimal grain.

TABLE 1

|  |  | Black | Cyan | Magenta | Yellow |
|---|---|---|---|---|---|
| Pigment Load (in wt %) | Magenta |  |  | 3.20% |  |
|  | Black | 2.56% |  |  |  |
|  | Cyan |  | 1.69% |  |  |
|  | Yellow |  |  |  | 2.75% |
| Latex | Acrylic Latex | 10.00% | 10.00% | 10.00% | 10.00% |
| Solvent | 1, 2 Butanediol | 18.00% | 18.00% | 18.00% | 18.00% |
|  | Glycol ether | 2.00% | 2.00% | 2.00% | 2.00% |
| Surfactant | Phosphate ester surfactant | 0.20% | 0.20% | 0.20% | 0.20% |
|  | Secondary alcohol ethoxylate | 0.40% | 0.40% | 0.40% | 0.40% |
|  | Non-ionic fluorosurfactant | 0.40% | 0.40% | 0.40% | 0.40% |
| Additive | Chelating agent | 0.04% | 0.04% | 0.04% | 0.04% |
|  | Dispersant | 0.0075% | 0.0075% | 0.0075% | 0.0075% |
|  | Water | Balance | Balance | Balance | Balance |

TABLE 2

Example 1

|  |  | Light Cyan 1 | Light Magenta 1 |
|---|---|---|---|
| Pigment Load (in wt %) | Magenta |  | 0.62% |
|  | Cyan | 0.38% |  |
| Latex | Acrylic Latex | 10.00% | 10.00% |
| Solvent | 1, 2 Butanediol | 18.00% | 18.00% |
|  | Glycol ether | 2.00% | 2.00% |
| Surfactant | Phosphate ester surfactant | 0.20% | 0.20% |
|  | Secondary alcohol ethoxylate | 0.40% | 0.40% |
|  | Non-ionic fluorosurfactant | 0.40% | 0.40% |
| Additive | Chelating agent | 0.04% | 0.04% |
|  | Dispersant | 0.0075% | 0.0075% |
|  | Water | Balance | Balance |

TABLE 3

Example 2

|  |  | Light Cyan 2 | Light Magenta 2 |
|---|---|---|---|
| Pigment Load (in wt %) | Magenta |  | 0.87% |
|  | Cyan | 0.56% |  |
| Latex | Acrylic Latex | 10.00% | 10.00% |
| Solvent | 1, 2 Butanediol | 18.00% | 18.00% |
|  | Glcyol ether | 2.00% | 2.00% |
| Surfactant | Phosphate ester surfactant | 0.20% | 0.20% |
|  | Secondary alcohol ethoxylate | 0.40% | 0.40% |
|  | Non-ionic fluorosurfactant | 0.40% | 0.40% |
| Additive | Chelating agent | 0.04% | 0.04% |
|  | Dispersant | 0.0075% | 0.0075% |
|  | Water | Balance | Balance |

TABLE 4

Example 3

|  |  | Light Cyan 3 | Light Magenta 3 |
|---|---|---|---|
| Pigment Load (in wt %) | Magenta |  | 1.07% |
|  | Cyan | 0.75% |  |
| Latex | Acrylic Latex | 10.00% | 10.00% |
| Solvent | 1, 2 Butanediol | 18.00% | 18.00% |
|  | Glycol ether | 2.00% | 2.00% |
| Surfactant | Phosphate ester surfactant | 0.20% | 0.20% |
|  | Secondary alcohol ethoxylate | 0.40% | 0.40% |
|  | Non-ionic fluorosurfactant | 0.40% | 0.40% |
| Additive | Chelating agent | 0.04% | 0.04% |
|  | Dispersant | 0.0075% | 0.0075% |
|  | Water | Balance | Balance |

TABLE 5

| Example | Light Cyan (wt %) | Light Magenta (wt %) | Grain |
|---|---|---|---|
| 1 | 0.38% | 0.62% | OK |
| 2 | 0.56% | 0.87% | Good |
| 3 | 0.75% | 1.07% | Poor |

While the compositions, methods and related aspects have been described with reference to certain examples, it will be appreciated that various modifications, changes, omissions, and substitutions can be made without departing from the spirit of the disclosure. It is intended, therefore, that cartridges, compositions, methods and related aspects be limited only by the scope of the following claims. Unless otherwise stated, the features of any dependent claim can be combined with the features of any of the other dependent claims, and any other independent claim.

The invention claimed is:
1. An ink set for use in inkjet printing, comprising:
a first cyan ink comprising from 1 wt % to 2.5 wt % of a cyan pigment, from 5 wt % to 15 wt % of a latex binder, and an ink vehicle;

a second cyan ink comprising from 0.25 wt % to 0.64 wt % of a cyan pigment, from 5 wt % to 15 wt % of a latex binder, and an ink vehicle;
a first magenta ink comprising from 2 wt % to 4 wt % of a magenta pigment, from 5 wt % to 15 wt % of a latex binder, and an ink vehicle; and
a second magenta ink comprising from 0.4 wt % to 0.97 wt % of a magenta pigment, from 5 wt % to 15 wt % of a latex binder, and an ink vehicle;
wherein one or more of the first cyan ink, the second cyan ink, the first magenta ink and the second magenta ink comprise an aliphatic alcohol as co-solvent in an amount of at least 4 wt % of the total weight of the ink.

2. An ink set according to claim 1, further comprising:
a black ink comprising from 1 wt % to 5 wt % of a black pigment, from 5 wt % to 15 wt % of a latex binder, and an ink vehicle.

3. An ink set according to claim 1, further comprising:
a yellow ink comprising from 1 wt % to 5 wt % of a yellow pigment, from 5 wt % to 15 wt % of a latex binder, and an ink vehicle.

4. An ink set according to claim 1, wherein the second cyan ink comprises from 0.4 wt % to 0.6 wt % of a cyan pigment.

5. An ink set according to claim 1, wherein the second magenta ink comprises from 0.8 wt % to 0.9 wt % of a magenta pigment.

6. An ink set according to claim 1, wherein one or more of the first cyan ink, the second cyan ink, the first magenta ink and the second magenta ink comprise from 5 wt % to 8 wt % of a latex binder.

7. An ink set according to claim 1, wherein the latex binder in one or more of the first cyan ink, the second cyan ink, the first magenta ink and the second magenta ink comprises a copolymer comprising alkyl (meth)acrylate monomers, cyclohexyl (meth)acrylate monomers and (meth)acrylic acid monomer.

8. An ink set according to claim 1, wherein the ink vehicle in one or more of the first cyan ink, the second cyan ink, the first magenta ink and the second magenta ink further comprises a glycol ether as co-solvent in an amount of less than about 5 wt % of the total weight of the ink.

9. An ink set for use in inkjet printing, comprising:
a first cyan ink comprising from 1 wt % to 2.5 wt % of a cyan pigment, from 5 wt % to 15 wt % of a latex binder, and an ink vehicle;
a second cyan ink comprising from 0.25 wt % to 0.64 wt % of a cyan pigment, from 5 wt % to 15 wt % of a latex binder, and an ink vehicle;
a first magenta ink comprising from 2 wt % to 4 wt % of a magenta pigment, from 5 wt % to 15 wt % of a latex binder, and an ink vehicle; and
a second magenta ink comprising from 0.4 wt % to 0.97 wt % of a magenta pigment, from 5 wt % to 15 wt % of a latex binder, and an ink vehicle;
wherein one or more of the first cyan ink, the second cyan ink, the first magenta ink and the second magenta ink further comprise butanediol as co-solvent.

10. An ink set for use in inkjet printing, comprising:
a first cyan ink comprising from 1 wt % to 2.5 wt % of a cyan pigment, from 5 wt % to 15 wt % of a latex binder, and an ink vehicle;
a second cyan ink comprising from 0.25 wt % to 0.64 wt % of a cyan pigment, from 5 wt % to 15 wt % of a latex binder, and an ink vehicle;
a first magenta ink comprising from 2 wt % to 4 wt % of a magenta pigment, from 5 wt % to 15 wt % of a latex binder, and an ink vehicle; and
a second magenta ink comprising from 0.4 wt % to 0.97 wt % of a magenta pigment, from 5 wt % to 15 wt % of a latex binder, and an ink vehicle;
wherein one or more of the first cyan ink, the second cyan ink, the first magenta ink and the second magenta ink comprises less than 10% 2-pyrrolidone as co-solvent.

11. A method of inkjet printing, comprising:
printing an amount of ink from an ink set onto a low or non-porous media substrate, the ink set comprising:
a first cyan ink comprising from 1 wt % to 2.5 wt % of a cyan pigment, from 5 wt % to 15 wt % of a latex binder, and an ink vehicle;
a second cyan ink comprising from 0.25 wt % to 0.64 wt % of a cyan pigment, from 5 wt % to 15 wt % of a latex binder, and an ink vehicle;
a first magenta ink comprising from 2 wt % to 4 wt % of a magenta pigment, from 5 wt % to 15 wt % of a latex binder, and an ink vehicle; and
a second magenta ink comprising from 0.4 wt % to 0.97 wt % of a magenta pigment, from 5 wt % to 15 wt % of a latex binder, and an ink vehicle;
wherein one or more of the first cyan ink, the second cyan ink, the first magenta ink and the second magenta ink comprise an aliphatic alcohol as co-solvent in an amount of at least 4 wt % of the total weight of the ink.

12. A method according to claim 11, wherein the low or non-porous media substrate comprises one or more of vinyl, polycarbonate, polytetrafluoroethylene (PTFE), polyester, acrylic, polyethylene, polypropylene, polystyrene, cellulose, a metal, a ceramic, or a glass.

13. A method according to claim 11, wherein the printing method comprises a thermal inkjet printing method.

14. A method according to claim 11, wherein the ink set further comprises one or more of:
a black ink comprising from 1 wt % to 5 wt % of a black pigment, from 5 wt % to 15 wt % of a latex binder, and an ink vehicle; and
a yellow ink comprising from 1 wt % to 5 wt % of a yellow pigment, from 5 wt % to 15 wt % of a latex binder, and an ink vehicle.

* * * * *